United States Patent
Huang et al.

(10) Patent No.: US 7,853,548 B2
(45) Date of Patent: Dec. 14, 2010

(54) METHODOLOGY AND COMPUTER PROGRAM PRODUCT FOR EFFECTING RULE EVALUATION IN POLICY BASED DATA MANAGEMENT

(75) Inventors: Lan Huang, Sunnyvale, CA (US); Windsor Wee Sun Hsu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/034,238

(22) Filed: Feb. 20, 2008

(65) Prior Publication Data

US 2009/0210374 A1   Aug. 20, 2009

(51) Int. Cl.
   *G06N 5/00* (2006.01)
(52) U.S. Cl. .......................................... 706/47; 706/45
(58) Field of Classification Search ............. 706/47, 706/45
See application file for complete search history.

(56) References Cited

U.S. PATENT DOCUMENTS

| | | | |
|---|---|---|---|
| 5,506,986 | A | 4/1996 | Healy |
| 7,069,437 | B2 * | 6/2006 | Williams ............... 713/166 |
| 7,082,505 | B2 | 7/2006 | Chen |
| 2002/0069200 | A1 | 6/2002 | Cooper |
| 2003/0115204 | A1 | 6/2003 | Greenblatt |
| 2004/0098415 | A1 | 5/2004 | Bone |
| 2006/0080371 | A1 | 4/2006 | Wong |
| 2006/0101095 | A1 | 5/2006 | Episale |
| 2006/0136485 | A1 | 6/2006 | Yared |
| 2006/0224550 | A1 | 10/2006 | Gopisetty |

* cited by examiner

*Primary Examiner*—Wilbert L Starks, Jr.
(74) *Attorney, Agent, or Firm*—Cantor Colburn LLP; Mohammad Kashef

(57) ABSTRACT

The invention relates to a system and method for providing efficient policy rule updates in policy-based data management. More particularly, the invention relates to a system and method for restraining the size of the set of data objects to be examined after a policy rule evaluation.

1 Claim, 2 Drawing Sheets

METHODOLOGY AND COMPUTER PROGRAM PRODUCT FOR EFFECTING RULE EVALUATION IN POLICY BASED DATA MANAGEMENT

CROSS-REFERENCE TO RELATED APPLICATIONS

This application contains subject matter that is related to the subject matter of the following co-pending application, U.S. patent application Ser. No. 11/856,475, entitled "System and Method for Efficient Rule Updates in Policy Based Data Management," filed Sep. 17, 2007, the entirety of which is hereby incorporated herein by reference, which is assigned to the same assignee as this application, International Business Machines Corporation of Armonk, N.Y.

BACKGROUND OF THE INVENTION

1. Field of the Invention

The invention relates to a system and method for providing efficient policy rule updates in policy-based data management. More particularly, the invention relates to a system and method for restraining the size of the set of data objects to be examined after a policy rule evaluation.

2. Description of Background

Many data objects such as business records, weather data, security information, and the like are now stored on digital media. Users of storage systems may have millions or even billions of data objects to manage. Manually managing such large numbers of data objects is not practical. Policy based data management automates tasks to a great extent and is essential for a system containing large numbers of data object.

SUMMARY OF THE INVENTION

The shortcomings of the prior art are overcome and additional advantages are provided through the provision of a method for implementing rule evaluation within a policy-based data management system. The method comprises analyzing common rule conditions and action patterns of a predetermined set of policy rules, wherein the analyzation of the common rule conditions and action patterns of a predetermined set of policy rules comprises determining a set of attributes that are to be indexed. The determining of the attributes comprises parsing component unit expressions for a rule condition, and for each unit expression classifying an operand as a constant or variable operand, classifying an attribute as a dynamic or static attribute, classifying an action pattern as a one-time or recurring action pattern, classifying the unit expression as a static or dynamic unit expression, indexing each attribute that is associated with a non-static unit expressions, and creating change logs for each attribute that is only associated with a static unit expression.

The method also comprises generating a collective change log for each static unit expression, wherein the collective change log is the union of the attribute change logs for all component attributes of the static unit expression, identifying a cache result set for the static unit expression, wherein the cache result set is combined within a final result change log set, scanning objects comprised within the change log set, wherein in the instance that an object is a match for the static unit expression then it is added to the change log set, and conversely, in the instance that an object is not a match for the static unit expression the object is removed from the change log set in the event that the object was comprised within the cache result set, returning a final change log result set for the static unit expression, and minimizing the number of objects that are to be checked for a condition evaluation.

Computer program products corresponding to the above-summarized methods are described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the exemplary embodiment of the present invention can be implemented within a conventional computing system environment comprising hardware and software elements. Specifically, the methodologies of the present invention can be implemented to program a conventional computer system in order to accomplish the prescribed tasks of the present invention as described below.

Generally, policy rules are comprised of four parts: a scope, a priority, a condition, and an action. Examples of rules are presented in Table 1.

TABLE 1

| Rule | Scope | Priority | Condition | Action |
| --- | --- | --- | --- | --- |
| 1 | Expiration | 1 | The creation time is older than a year ago | Deletion |
| 2 | Confidentiality | 1 | The suffix is password | Assign Confidential Level 5 |
| 3 | Confidentiality | 2 | The owner of the file is Jack | Assign Confidential Level 4 |

Figure 1:
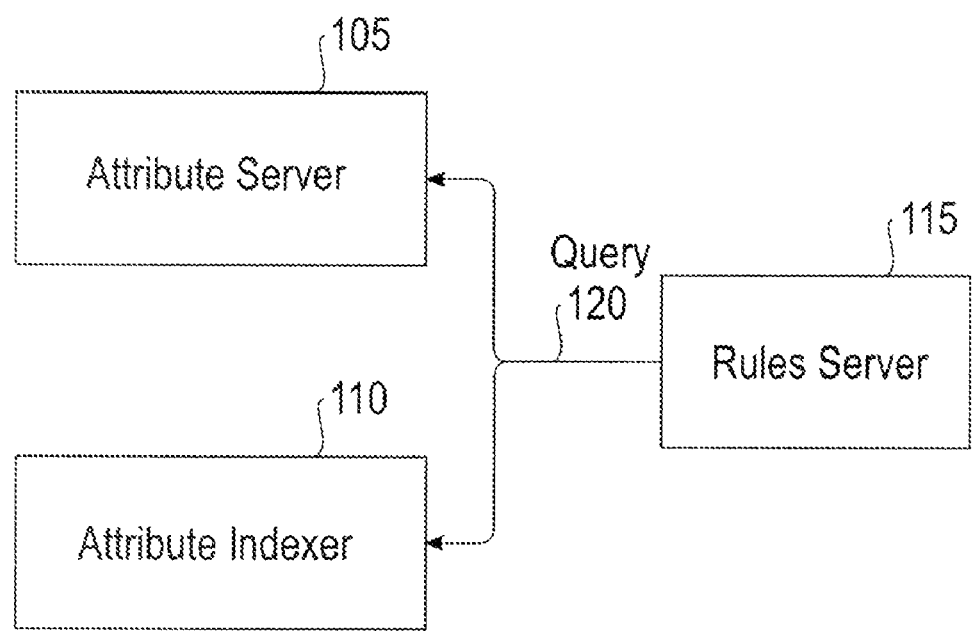
FIG. 1 illustrates an example of a prior art policy-based data management system.

For any rule, once its condition is met, the corresponding action is taken. For example. In regard to Rule 1, the system will search for those files who match the condition of the creation time is older than a year ago and delete them. In order to manage billions of objects, a system must be configured to support efficient rule condition checks over a large amount of managed objects, whose attributes may change over time. FIG. 1 illustrates the system components for a system 100 that realizes policy-based data management. The policy-based data management system 100 of FIG. 1 is composed of three components: an attribute server 105, an attribute indexer 110, and a rules engine 115.

The condition part of a rule checks the attributes for each object. These attributes, in a data management system, often include, content category, file size, ownership, retention, usage patterns etc. The attribute server 105 is the component that maintains the attributes. A rule condition can be checked against all the objects one by one. Thus, with M rules and N objects in the system, the current approach makes M×N scans to evaluate all the M rules against all the N managed objects. It can be a prohibitively expensive job, if N is in the orders of million or billion, which is often the case. To speed up rule condition evaluation, these attributes are often indexed. The attribute indexer 110 manages the indices. The rules engine 115 takes in user defined policy rules, checks them against the attributes. For those objects whose attributes match the description of a rule's condition, this rule's actions will be applied to them.

With the huge number of objects to be managed, efficient rule condition check is critical to the system performance and scalability. Within exemplary embodiments of the present invention the attribute server 105 and the attribute indexer can comprise a database. As such, the database will store the attributes for each object in database tables and indices that are created for the table columns. Within this exemplary embodiment a condition check translates to a database query 120. By default, at least one primary index is created for a table in the database. Each insertion into a table may trigger a few lookups and updates into the index, which adds up to the total latency of an insertion operation.

Policy-based management tasks share the common characteristics to be recurrent. Condition checks are carried out repeatedly. The number of queries involved is relatively small, similar to the number of rules. The number of attributes is relatively small as well. The query result often is a list of objects and the query may require checking a significant portion of the database table space. Within the exemplary embodiments the common rule condition and action patterns of policy rules are automatically analyzed, and further, the number of objects to be checked for any condition evaluation is minimized by automatically analyzing the policy rules at rule parsing time and thereafter deciding which attributes for which to create indices. For those attribute columns without indices, a change log and an optional query result log are maintained to effectively reduce the evaluation latency.

A condition expression composes of one or more unit expressions. A unit expression is an expression containing a single operator and a few operands. Operands are attributes, maintained by the attribute server 105. Operands can also be user defined values. Attributes can be characterized as relative static attributes (e.g., retention time, which does not change often once defined), or as dynamic attributes (e.g., access time, which changes frequently). The operand values to be compared with the attributes can be classified as constant operand or variable operand. The action to be taken can be categorized as a one-time action (e.g., moving files from pool-a to pool-b or delete a file etc.) or a recurring action.

One-time action is the action that only needs to be carried out once. The effect of carrying out the action multiple times is equal to that of carrying out it once. An example of a recurring action is downgrading a service level by one. The effect of repeated execution of this type of action is not equal to carrying it out once. A further example of a recurring action is verifying the correctness of the content. This verification action needs to be carried out multiple times. The present methodology analyzes the patterns of the rule components at rule parsing time. The system takes input from user to collect information about the characteristics of attributes, actions. At rule parsing time, the attributes and actions in the rules are compared against the collected information to decide their patterns.

In our classification, a unit expression is a Static Unit Expression if it is only composed of static attribute(s) and constant operands. Based on the properties of the component attributes and the component operands in a unit expression, we categorize a unit expression into two categories: static or non-static (Table 2).

TABLE 2

|  | Static Attribute | Dynamic Attribute |
| --- | --- | --- |
| Constant Operand | Static | Non-Static |
| Variable Operand | Non-Static | Non-Static |

Rule 2 and Rule 3 in Table 1 are examples of static unit expressions. Rule 1 is an example of a non-static unit expression since the operand "a year from today" involves variable "today".

To automatically decide which attributes to be indexed, the system executes the following steps against all the rules:

Given a rule condition, parse out the component unit expressions. And, for each unit, expression, do the following:
1. Classify the operand(s) as constant or variable.
2. Classify the attribute(s) as dynamic or static.
3. Classify the action pattern as one-time or recurring.
4. Classify the unit expression as static or dynamic unit expression based on the above results and Table 2.
5. Decision: Index those attributes that appear in any non-Static Unit Expression. Do not index those attributes that appear only in Static Unit Expression. Instead, we will keep change logs for them.

For an attribute that solely appears as a static unit expression, instead of building its index, we log its change status since its latest rule execution. The change tog can be per attribute. Besides the change logs per attributes, the system may optionally maintain a change log per object. Whenever any attribute of the object is updated, a change entry is added to the change log per object. A change log per attribute is the finest granule of change log one can maintain. With these detailed change logs per attribute, one can compose a collective change log that a query needs to check. This collective change log contains all the objects, whose attributes in the query have changed since the last condition check. A change log per object is a more coarse granule log than the per attribute logs. It may contain false entries that have not changed for a particular condition check. Those false entries get added to the log when the attributes which are not in a condition check change.

For the cases where the number false entries in a change log per object is reasonably small, one can choose to use change log per object only to save the logging cost. But if the false entries are too many, it will affect the performance of rule evaluation and finer granule change logs should be created. In our preferred embodiment, we choose to keep track of two change logs. One change log is per object for ail attributes, which tracks those objects, any of whose attributes has changed. The other change log is for static attributes, which tracks those objects, any of whose static attributes has changed.

The per static attributes change log is significantly smaller than the change log per object. We assume that the policy rules are evaluated intermittently. A change log is purged once a rule execution is finished, when the change log will not be used anymore. New changes will be inserted into the change log for the next policy execution.

The present method maintains a change log per object for all attributes, a change log per object for static attributes, optional static unit expression query cache, and optional one-time action hit items cache. Assume the attribute server is a database server and most of the attributes are stored in one database table. An additional column "change status" is defined to record the change status for each object since the last rule execution. Further, another column "static change status" is defined to record the change status for the static attributes for each object. One embodiment of the query cache and the action cache is to store them as database tables. The unique id of the object is indexed as the key by the database. However, the caches are for performance optimization and are optional. Table 3 summarizes the possible eight unit expression cases for rule evaluation and execution.

TABLE 3

| Case | Unit Expression Condition | One-Time Action | Recurring Action |
|---|---|---|---|
| 1 | Static Unit Expression in Static Rule | 1.1 Partial List from Change Log | 1.2 Full list from a Merging Change Log and Query Cache or Scanning Intermediate List |
| 2 | Static Unit Expression in Changing Rule | 2.1 Scanning Intermediate List of Expression with Index, excluding last action hit items | 2.2 Scanning Intermediate List of Expression with Index |
| 3 | Non-Static Unit Expression in Static Rule | 3.1 partial List from Index that is filtered by Change Log | 3.2 Full List from Index |
| 4 | No-Static Unit Expression in Changing Rule | 4.1 Full List from Index that excludes last action hit item | 4.2 Full List from Index |

As shown in Table 3, by "Full List" we refer to a complete list of all the objects matching the unit expression. By "Partial List," we refer to a list of matching objects, which excludes non-changing objects since last policy execution or those objects have the actions applied to already. In the rest of the section, we will first describe the most common ease we aim to optimize (i.e., case 1.1 and case 3.1 in Table 3). Then we will describe all the other possible eases to complete the whole picture of rule evaluation in our system.

Within case 1.1 and case 3.1 a static rule is a rule whose condition part does not change over time (i.e., is one who contains constant operands only). Those rules which perform one-time action on static condition (e.g. Rule 2 and Rule 3 in Table 1), are common in the context of data management. For these rules, the objects that has been applied the action to can be skipped for the next round of policy execution. The reason is that the rule does not change and they have been applied the action to once before.

Suppose the condition part of an example rule looks like: S1 AND S2 AND NS3. S1 and S2 are two static unit expressions (Case 1.1 in Table 3). NS3 is a component non-static unit expression with constant operands (Case 3.1 in Table 3). The rule's condition contains constant operands only and it is a static rule. In addition, this example rule contains one-time action only. To find the hit list of objects for this rule, the following query is sent to the attribute server, in this case a database server: S1 AND S2 AND NS3 AND ChangeStatus=Yes. The database query optimizer will figure out a proper way to evaluate this query. Here is how it will typically evaluate such a query. The hit list of ChangeStatus=Yes is the change log per object since the last rule execution. This can be retrieved by querying the database on the "change status" column, which is indexed. The intermediate result for NS3 is computed from querying against the index built for the dynamic attributes.

The result from joining these two intermediate result set is the list of objects that will be scanned for S1 and S2. It is significantly smaller than the complete object space. Once this round of rule execution is finished, the change status column is reset. Any changes to the object afterwards will be recorded in this column for the next round of policy execution. In another example, the rule condition contains only static unit expressions. An example rule looks like: S1 AND S2. In this case, the following query is sent to the database server: S1 AND S2 AND StaticChangeStatus=Yes. The system will scan ail the hit items for "Static Change Status=Yes" for condition S1 and S2. Since the static change log is even smaller than the change log per object, the scanning step is efficient enough. Static rules with recurring actions are exemplified in case 1.2 and case 3.2. The commonality between case 1 and case 3 is that their component unit expressions do not contain variable operands (i.e., they have static rule conditions). This property guarantees that the expression itself does not change over multiple checks.

For case 1.2 and case 3.2, the action is recurring and needs to be applied to all the objects matching the condition. We have two approaches to evaluate the rule condition, in the first approach, the evaluator starts with the non-static unit expression, which has index built for its attributes. The objects in intermediate result set will be scanned one by one to evaluate the static unit expression condition. This approach limits the scanning space by evaluating the sub-expression with index first. This is typically how a database will execute such a query. Since case 1.2 and case 3.2 are not the common cases, hence the limited scanning does not affect much of the system performance.

In the second approach, the evaluator evaluates the component unit expression separately and joins the intermediate lists into a final result list. This approach is useful, when we want to avoid scanning the complete object space and there is no indexed expression in the rule condition at all to help achieve that. This situation can appear in Case 1.2, where the rule conditions contain static unit expressions only.

The intermediate result for unit expression should return a full list of matching objects, whether they have changed or not since the last round of policy execution. For non-static unit expressions, the full list can be computed from the index (case 3.2). For static unit expression (case 1.2), since the rule condition does not change, the cached result for it can be reused. The cached result can be "merged" with the evaluation result on the changed log to generate the final result set. The merging process here is not a simple addition operation in that it invalidates the non-matching items in the cached result due to object changes. The benefit of maintaining the change log and the query cache is that it helps to avoid scanning the complete object space again.

If the system maintains a query cache, here is how the complete result for a static unit expression is computed which is joined later with the intermediate result lists of other component unit expressions:

1. Generate the collective change log for the static unit expression, which is the union of ail the per attribute change log for all the component attributes of this unit expression. In our preferred embodiment system, we can choose from the per object change log for all the attributes or the change log for static attributes.

2. Find the cache result set for this static unit expression and add it to the tentative final result set.

3. Scan the objects in this change log. If it is a match for the unit condition, add it to the final result set.

4. While scanning the change log, for the object that is not a matching item for the rule condition, remove it from the final result set, if the object was in the cached result set. This is essentially a cache invalidation step for updated objects.

5. Return the final result set for this static unit expression.

Case 2 and case 4 are examples of changing rules. If the rule condition contains variable operand(s) in any of its component unit expressions and may change over time, then computing the hit list solely from the change log is insufficient. Some of the non-changing objects may match the new condition query as well, since the condition expression itself has changed. A changing rule must contain a non-static unit expression, which is indexed by the attribute server. So the system can first get the intermediate result for the non-static unit expression by querying against the index. Then the items in this hit list are scanned for the rest of the static unit expression matching. This evaluation plan achieves better performance than scanning the whole system space. For case 2.1 and case 4.1, with one-time action, the final hit list for the new condition check, excluding the items on the hit list of the one-time action execution, also needs to be applied the action of the rule. The present method maintains which record has the one-time action applied to already as a one-time action hit item cache. For case 2.2 and case 4.2, with recurring action, all items on the final hit list will be applied the action to.

Figure 2:
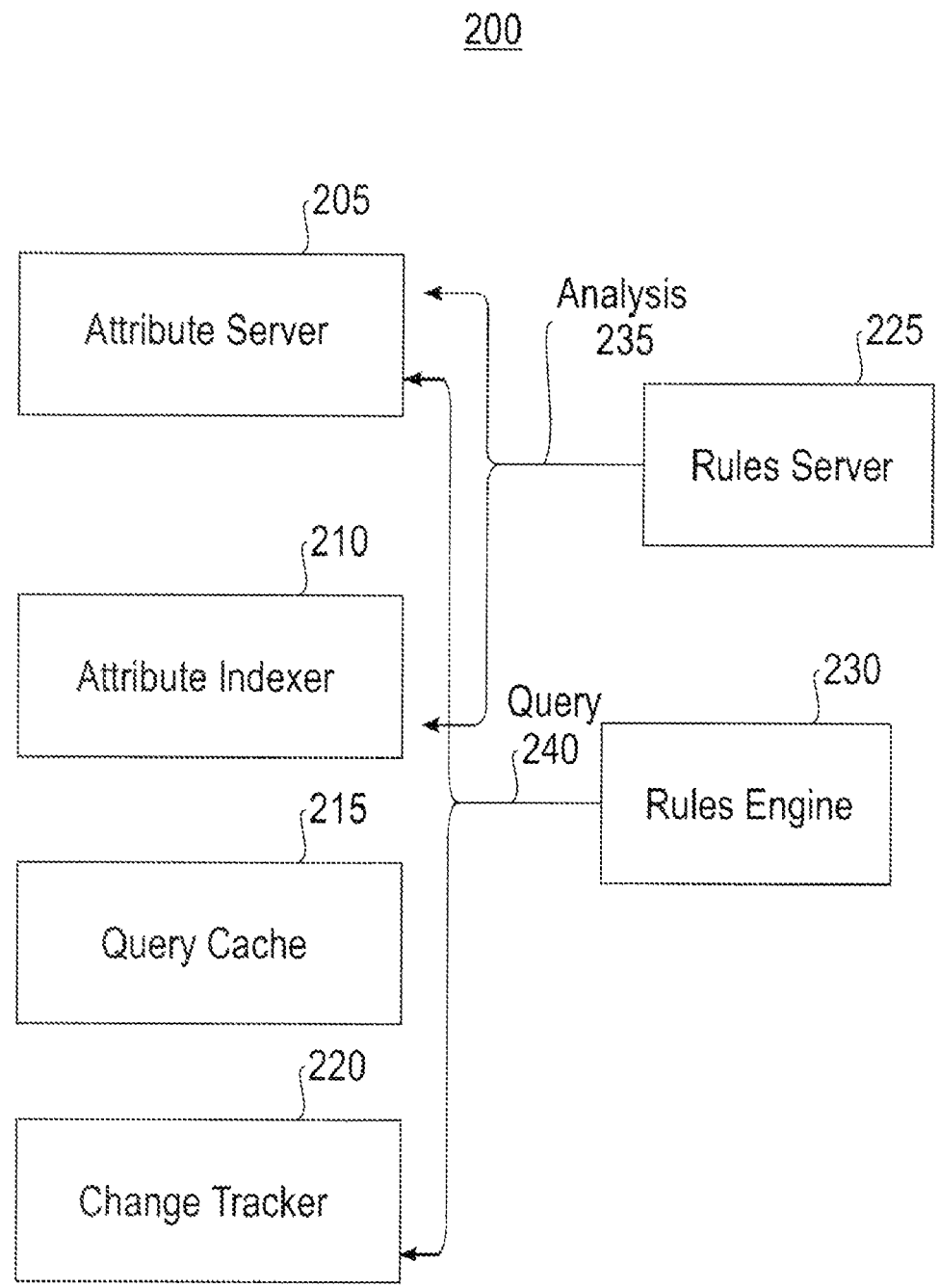
FIG. 2 illustrates one example of a policy-based data management system in accordance with exemplary embodiments of the present invention.

FIG. 2 illustrates the components of an exemplary system 200 in accordance with the exemplary embodiments of the present invention, in addition to an attribute server 205, an attribute indexer 210, and a rules engine 230, the system 200 comprises a rules analyzer 225, a change tracker 220 and a query cache component 215. The rules analyzer 225 analyzes the rules and makes decisions on which attributes to build index for and whether a change log is required. The change tracker 220 maintains the change information per attribute or per object.

How is a component unit expression evaluated in various cases of unit expression, rule condition and action pattern combination. Case 1.1 and case 3.1 are the two most common cases that an exemplary embodiment of the system 200 can optimize, intermediate list is the intermediate result of part (not all) of the Boolean rule expression; however, it needs further process to generate the final result. The timing of each possible condition check for all the rules is logged and the oldest of them is the time to which the change log will trace back. Changes before this time will be discarded for space efficiency. The Query Cache selectively logs the query results of the last condition checks for each rule whenever necessary. Further, whenever new rules are added to the system, or an existing rule is updated, the Rules Analyzer will reexamine the rules and make new decisions on which attributes to build index for and which change logs to maintain as such, the first condition check for the new rule will be a full scan.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing rule evaluation within a policy-based data management system, the method consisting of:

analyzing common rule conditions and action patterns of a predetermined set of policy rules, wherein the analyzation of the common rule conditions and action patterns of a predetermined set of policy rules comprises determining a set of attributes that are to be indexed, the determining of the attributes comprising:

parsing component unit expressions for a rule condition, and for each unit expression:

classifying an operand as a constant or variable operand;

classifying an attribute as a dynamic attribute, which changes frequently over time, or a static attribute, which does not change over time once defined;

classifying an action pattern as a one-time or recurring action pattern;

classifying the unit expression as a static or dynamic unit expression, wherein the unit expression is a static unit expression if it is only composed of static attributes and constant operands;

indexing each attribute that is associated with a non-static unit expressions;

creating change logs for each attribute that is only associated with a static unit expression, wherein one change log is per object for all attributes, which tracks the objects for all attributes, any of whose attributes has changed, and another change log is for static attributes, which tracks objects of whose static attributes has changed;

generating a collective change log for each static unit expression, wherein the collective change log is the union of the attribute change logs for all component attributes of the static unit expression;

identifying a cache result set for the static unit expression, wherein the cache result set is combined within a final result change log set;

scanning objects comprised within the change log set, wherein in the instance that an object is a match for the static unit expression then it is added to the change log set, and conversely, in the instance that an object is not a match for the static unit expression the object is removed from the change log set in the event that the object was comprised within the cache result set;

returning a final change log result set for the static unit expression; and minimizing the number of objects that are to be checked for a condition evaluation.

* * * * *